July 4, 1933. C. G. OLSON 1,916,526
LOCK WASHER WITH KEYS
Filed Aug. 6, 1930
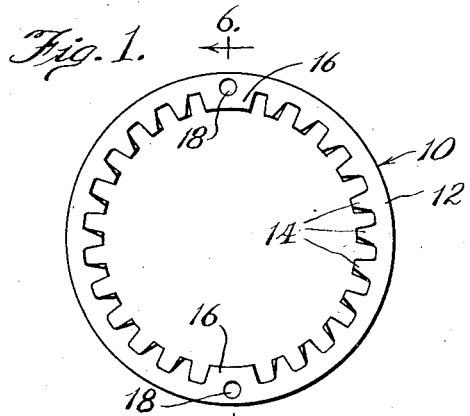
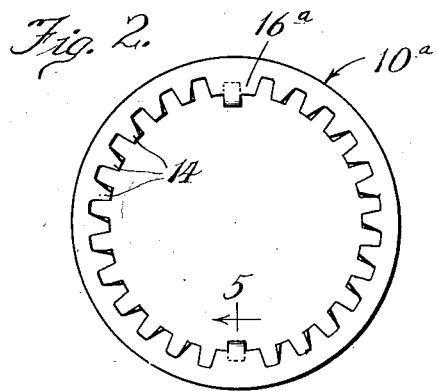
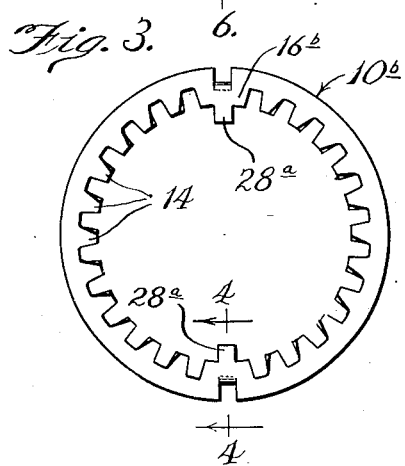
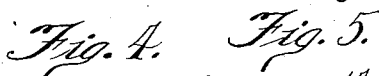
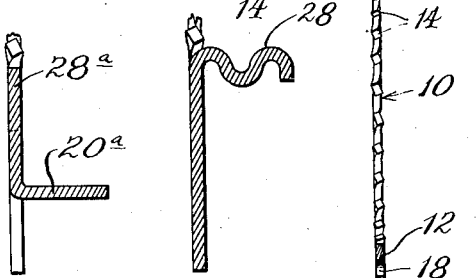
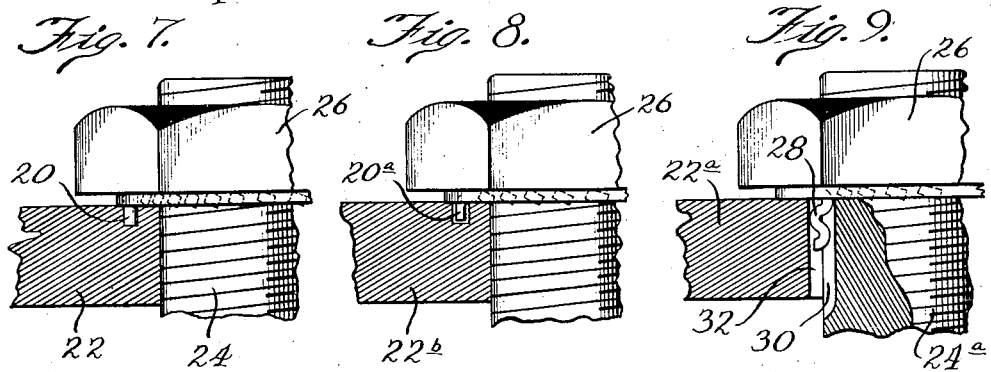
Inventor:
Carl G. Olson
By Cheever, Cox & Moore
Att'ys Patented July 4, 1933

1,916,526

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER WITH KEYS

Application filed August 6, 1930. Serial No. 473,328.

My invention relates generally to lock washers, and more particularly to lock washers which are adapted to be secured against rotation within a work piece.

It is in some instances desirable, in employing lock washers, as, for example, lock washers of the type having a plurality of prongs associated with an annular body portion, to provide means for oppositely securing the washer against rotation with respect to the work piece.

It is one of the primary objects of my present invention to provide a lock washer of the above mentioned type, which is provided with means, in addition to the locking teeth, which is adapted to cooperate with the work piece with which the washer is associated, to secure said washer against rotation.

More specifically, it is an object of my invention to provide in combination with a lock washer, means extending laterally of the plane of said washer which is adapted to interlock with the work piece, and thereby counteract any tendency for the washer to rotate with respect to the work piece when a member, such as a nut, is rotatively clamped thereagainst.

A further object of my invention is to provide a lock washer as above set forth, in which a portion of the stock thereof is deflected out of the plane of the washer body in position to be received by an aperture provided in the work with which the washer is associated.

In addition to the washer construction per se, my invention contemplates the provision of a new and improved combination with a work piece provided with an aperture and a lock washer positioned adjacent thereto, of means adapted to be received by the aperture in the work piece for securing the lock washer against displacement with respect thereto.

These and numerous other objects and advantages will be more apparent from the following detailed description when considered in connection with the accompanying drawing, wherein—

Figure 1 is an elevational view of a lock washer constructed in accordance with the teachings of my present invention and provided with apertures for receiving a locking pin;

Figure 2 is an elevational view of a lock washer of modified construction, in which a section of the lock washer, which is disposed laterally thereof, serves as a locking element;

Figure 3 is still a further modification, disclosing a lock washer which is equipped with means for interlocking with the work piece, and means for interlocking with a keyway of a screw for securing the lock washer against displacement;

Figure 4 is an enlarged fragmentary transverse sectional view taken substantially along the line 4—4 of Figure 3;

Figure 5 is an enlarged fragmentary sectional view taken along the line 5—5 of Figure 2;

Figure 6 is a transverse sectional view taken substantially along the line 6—6 of Figure 1;

Figure 7 is a fragmentary view disclosing a lock washer of the type shown in Figure 1, operatively associated with the work;

Figure 8 is a view similar to Figure 7, disclosing the lock washer of Figure 3, operatively associated with the work; and Figure 9 discloses the lock washer of Figure 2 in operative association with the work.

Referring now to the drawing more in detail, wherein like numerals have been employed to designate similar parts throughout the various figures, it will be noted that in Figure 1 I have disclosed a lock washer designated generally by the numeral 10, which includes a body portion 12 and a plurality of internal marginal teeth 14, which are twisted out of the plane of the washer body so as to provide locking elements on opposite sides of the washer. The structural arrangement of these teeth 14 does not form a part of the present invention, except in so far as said teeth enter into the general combination. In other words, my invention is not limited to a lock washer having a specific type of locking tooth, but for purposes of illustration I have disclosed a lock washer of the twisted tooth type.

At diametrically opposite positions along the internal margin of the washer I provide sections 16, and these sections are each formed with an aperture 18. This aperture 18 cooperates with a pin 20, Figure 7, in securing the washer 10 against rotation upon a work piece 22.

The work piece 22 is apertured to receive the pin 20 and the portion of said pin which projects above the surface of the work piece is received by the aperture 18 in the washer. When the washer 10 is operatively associated with a threaded member or screw 24 and the work piece 22 as shown in Figure 7, and a nut 26 is clamped against the washer, it will be apparent that the corners of the prongs 14 which project above the plane of the washer lockingly engage the adjacent surface of the nut so as to secure said nut against unscrewing. The lower corners of the teeth 14 are adapted to imbed themselves within the work piece 22 and thus cooperate with the oppositely disposed corners in securing the nut against unscrewing. The pin 20 serves as a positive means for locking the washer against relative rotation with respect to the work piece 22.

Referring to Figure 2, it will be seen that I disclose a lock washer designated generally by the numeral $10^a$, which is also provided with a plurality of teeth or prongs 14. A marginal section $16^a$ of the washer $10^a$ which corresponds to the section 16 of the washer shown in Figure 1, is formed with a laterally extending locking section or key 28, Figures 2, 5 and 9. This key 28 is adapted to extend partially within a keyway 30 provided in a threaded member or screw $24^a$ and partially within a groove $22^a$ which is formed in the work piece $22^a$. The key 28 is sinuously formed so as to afford sufficient thickness. Thus it will be seen in Figure 9 that when the washer $10^a$ is applied to the work piece $22^a$ and a screw $24^a$ and the nut 26 is clamped thereagainst, the sinuous key 28 serves as a positive means for securing the lock washer against relative rotation with respect to the screw and the work piece, and also for securing the screw against relative rotation with respect to the work piece. This construction is particularly applicable in instances where it is desirable to have all of the associated parts, including the screw, work piece, washer and nut, rotatable as a unit.

A still further modification is disclosed in Figures 3, 4, and 8, wherein I have shown a lock washer designated generally by the numeral $10^b$, said lock washer being provided with a plurality of internal marginal prongs 14. It will be observed that the washer $10^b$ is provided with a marginal section $16^b$ which corresponds in structural characteristics to the sections 16 and $16^a$ shown in Figures 1 and 2 respectively, and extending inwardly from the section $16^b$ is a key member $28^a$. This key member corresponds to the key 28 shown in Figure 9, but differs from the key 28 in that it only secures the lock washer $10^b$ against rotation with respect to the screw.

However, in order to secure the lock washer $10^b$ against rotation with respect to the work piece $22^b$ I provide a locking member or section $20^a$. This member $20^a$ corresponds in functional characteristics to the pin 20 of Figure 7 in that it is received by a companion aperture provided in the work piece and thus interlocks with the work piece so as to secure the washer and work piece against relative rotation. Thus the lock washer $10^b$ is provided with two separate elements, namely, elements $28^a$ and $20^a$ for securing the lock washer against movement with respect to the screw and work piece while the lock washer $10^a$ accomplishes the same result by the use of a single element, namely the key 28.

From the foregoing it will be apparent that my invention contemplates the provision of a lock washer provided with means whereby said washer may be effectively and positively secured against relative rotation with respect to both the screw and the work piece. My invention is particularly applicable in instances where it is desirable to apply a lock washer to a part having a hardened surface. Thus if the work piece 22, $22^a$ or $22^b$ were considered as hardened steel parts provided with apertures for receiving either the locking pin 20, the element $20^a$ or the key 28, it will be apparent that while the teeth of the lock washer adjacent the surface of the work piece might not imbed themselves within said surface, the locking elements just referred to would serve to prevent rotation between the washer and the work piece, and the teeth on the opposite side of the washer would serve to lockingly engage the softer material of the nut. It will thus be apparent that my invention is adaptable for a wide range of uses, and in view of its simple construction, it is adapted to be formed or blanked from a single sheet of flat stock.

While I have described a lock washer of a particular twisted tooth type and have shown certain forms of keyways and the like, it will be apparent that the invention is capable of many other modifications without departing from the spirit and scope thereof.

Having thus described my invention, what I claim as new and desire to secure by Letters Patent is:

1. The combination of a work piece and a threaded member extending therethrough, said work piece and threaded member each having a recess formed therein, a lock washer including a body portion, locking teeth extending out of the plane of the body portion, and a locking element extending from said lock washer into the recesses in said work piece and threaded member whereby all of said parts are secured against relative rotation.

2. A lock washer of the class described including an annular body portion, locking teeth extending out of the plane thereof, and a single locking element extending out of the plane of the washer which is adapted to interlock with a work piece and screw for securing said lock washer against relative rotation with respect thereto.

3. A lock washer formed from flat spring stock including an annular body portion, locking teeth extending out of the plane thereof, an element of corrugated cross section extending laterally of the washer body which is adapted to interlock with the workpiece and a screw to prevent relative rotation between the washer and said workpiece when a rotary clamping member is tightened against said washer.

In witness whereof, I have hereunto subscribed my name.

CARL G. OLSON.